(12) United States Patent
Hayashi et al.

(10) Patent No.: US 10,328,734 B2
(45) Date of Patent: Jun. 25, 2019

(54) METHOD FOR FORMING PRINT, METHOD FOR PEELING OFF TRANSFER LAYER, AND THERMAL TRANSFER PRINTER

(71) Applicant: Dai Nippon Printing Co., Ltd., Tokyo (JP)

(72) Inventors: Kenzo Hayashi, Tokyo (JP); Shinya Yoda, Tokyo (JP); Yuki Iwasaki, Tokyo (JP); Junpei Oomura, Tokyo (JP)

(73) Assignee: Dai Nippon Printing Co., Ltd., Shinjuku-Ku (JP)

( * ) Notice: Subject to any disclaimer, the term of this patent is extended or adjusted under 35 U.S.C. 154(b) by 0 days.

(21) Appl. No.: 15/763,984

(22) PCT Filed: Sep. 29, 2016

(86) PCT No.: PCT/JP2016/078805
§ 371 (c)(1),
(2) Date: Mar. 28, 2018

(87) PCT Pub. No.: WO2017/057565
PCT Pub. Date: Apr. 6, 2017

(65) Prior Publication Data
US 2018/0319191 A1    Nov. 8, 2018

(30) Foreign Application Priority Data

Sep. 30, 2015  (JP) ................... 2015-195349

(51) Int. Cl.
*B41M 5/382* (2006.01)
*B41J 2/325* (2006.01)
(Continued)

(52) U.S. Cl.
CPC .......... *B41M 5/38257* (2013.01); *B41J 2/325* (2013.01); *B41J 13/025* (2013.01);
(Continued)

(58) Field of Classification Search
CPC .... B41M 5/38257; B41M 5/345; B41M 5/52; B41M 5/38207; B41M 5/382;
(Continued)

(56) References Cited

U.S. PATENT DOCUMENTS 6,803,936 B2 * 10/2004 Odaka ................ B41M 5/38257
                                                        347/213
9,381,765 B2 *  7/2016 Sakamoto .............. B41M 5/345
(Continued)

FOREIGN PATENT DOCUMENTS

JP    2003-326865 A1   11/2003
JP    2004-074768 A1    3/2004
(Continued)

OTHER PUBLICATIONS

International Search Report and Written Opinion (Application No. PCT/JP2016/078805) dated Nov. 1, 2016.

*Primary Examiner* — Huan H Tran
(74) *Attorney, Agent, or Firm* — Burr & Brown, PLLC

(57) ABSTRACT

A method for forming a print obtained by transferring a transfer layer from which a removal region has been accurately removed onto a transfer receiving article and a method for peeling off a transfer layer by which a removal region of the transfer layer can be accurately removed. The method for forming a print comprises, by using a transfer film in which a transfer layer is provided on one surface of a support, a thermal transfer sheet in which a peel-off layer is provided on one surface of a substrate, and a transfer receiving article, a step of removing a removal region of the transfer layer of the transfer film by means of the peel-off layer of the thermal transfer sheet and a step of transferring the transfer layer from which the removal region has been removed onto the transfer receiving article.

8 Claims, 8 Drawing Sheets

(51) Int. Cl.
*B41J 13/02* (2006.01)
*B41M 5/34* (2006.01)
*B41M 5/52* (2006.01)
B32B 37/00 (2006.01)
B32B 38/10 (2006.01)
B41M 5/025 (2006.01)

(52) U.S. Cl.
CPC ............ *B41M 5/345* (2013.01); *B41M 5/382* (2013.01); *B41M 5/38207* (2013.01); *B41M 5/52* (2013.01); *B32B 37/025* (2013.01); *B32B 38/10* (2013.01); *B41M 5/0256* (2013.01)

(58) Field of Classification Search
CPC ...... B41M 5/0256; B41J 13/025; B41J 2/325; B32B 37/025; B32B 38/10
See application file for complete search history.

(56) References Cited

U.S. PATENT DOCUMENTS

| | | | |
|---|---|---|---|
| 2003/0174197 A1 | 9/2003 | Odaka et al. | |
| 2015/0035932 A1* | 2/2015 | Aihara | B41J 2/325 347/213 |
| 2015/0239273 A1 | 8/2015 | Sakamoto et al. | |

FOREIGN PATENT DOCUMENTS

| | | | |
|---|---|---|---|
| JP | 2009-279538 A1 | 12/2009 | |
| JP | 2014-080016 A1 | 5/2014 | |
| JP | 2015-030110 A1 | 2/2015 | |
| JP | 2015-101019 A1 | 6/2015 | |
| WO | 2014/050880 A1 | 4/2014 | |
| WO | WO-2016158497 A1 * | 10/2016 | ............ B41M 5/382 |

* cited by examiner

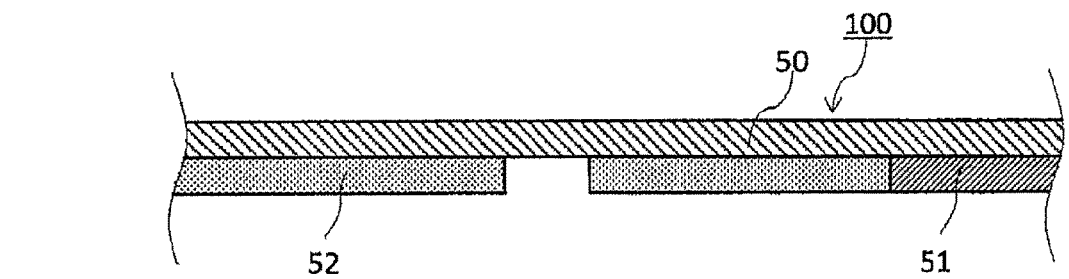
FIG.8(a) REMOVAL REGION OF TRANSFER LAYER
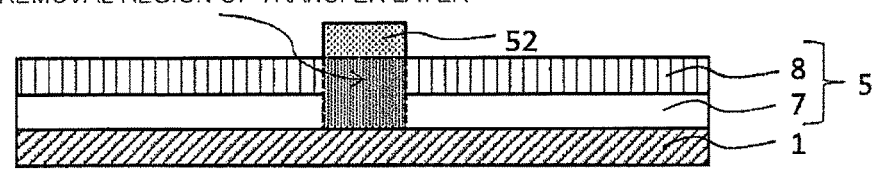
FIG.8(b)
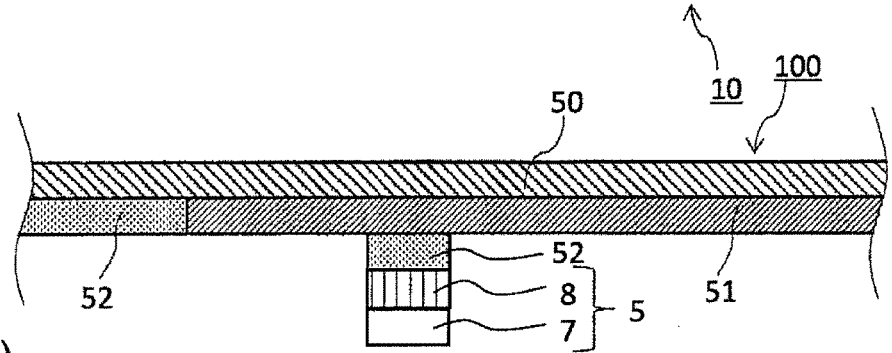
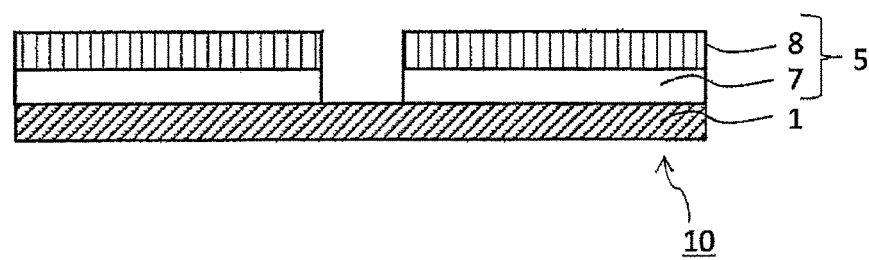
FIG.8(c)
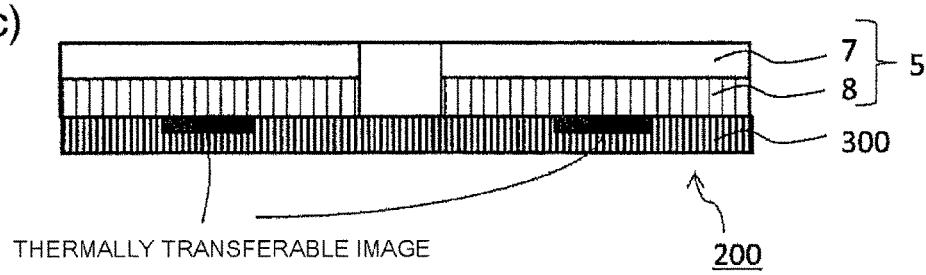
THERMALLY TRANSFERABLE IMAGE

METHOD FOR FORMING PRINT, METHOD FOR PEELING OFF TRANSFER LAYER, AND THERMAL TRANSFER PRINTER

TECHNICAL FIELD

The present invention relates to a method for forming a print, method for peeling off a transfer layer, and a thermal transfer printer.

BACKGROUND ART

For formation of a print employing a thermal transfer mode, a thermal transfer image-receiving sheet which is provided with a receiving layer on a substrate (e.g., Patent Literature 1) or an intermediate transfer medium in which a transfer layer in which a peeling layer and a receiving layer are layered in this order on a substrate is provided peelably from the substrate (e.g., Patent Literature 2) is employed. According to the thermal transfer image-receiving sheet that has been proposed in Patent Literature 1, a print can be obtained by forming a thermally transferable image on the receiving layer of the thermal transfer image-receiving sheet by means of a thermal transfer sheet having a colorant layer. According to the intermediate transfer medium that has been proposed in Patent Literature 2, a print where a thermally transferable image has been formed on an optional transfer receiving article can be obtained by forming the thermally transferable image on the receiving layer of the intermediate transfer medium by means of a thermal transfer sheet having a colorant layer, and then transferring the transfer layer which includes this receiving layer onto the optional transfer receiving article. Particularly, an intermediate transfer medium is particularly preferably used for transfer receiving articles onto which colorants are less likely to transfer and thus which cannot form a high-quality image directly thereon, transfer receiving articles which easily fuse with a colorant layer on thermal transfer and the like.

Improvement of the durability of an image formed product is also carried out by transferring a transferable protective layer onto the image formed product where a thermally transferable image has been formed by means of a protective layer transfer sheet in which a transferable protective layer is provided on a substrate (e.g., Patent Literature 3).

Incidentally, depending on the type of the print formed by means of an intermediate transfer medium, it may be necessary to leave a certain region untreated, for instance, regions allocated for an IC chip, a magnetic strip, a transmitting and receiving antenna unit, or a signature portion. Specifically, in the stage before the transfer layer is transferred onto a transfer receiving article, it may be necessary to remove a portion of the transfer layer corresponding to a region allocated for an IC chip, a magnetic strip, a transmitting and receiving antenna unit, a signature portion or the like. It also may be desired to selectively transfer a transferable protective layer onto an image formed product.

Under such circumstances, some attempts have been made, wherein, by using a thermal transfer sheet in which a peel-off layer is provided on one surface of a substrate, in the stage before the transfer layer of an intermediate transfer medium is transferred onto a transfer receiving article, a portion of the transfer layer, for example, a region of the transfer layer which is not desired to be transferred onto the transfer receiving article is removed by means of the peel-off layer in advance (it may be also referred to as "peeled off"). For example, Patent Literature 4 proposes a method in which, after the peel-off layer of a thermal transfer sheet and the transfer layer of an intermediate transfer medium are superimposed so as to be brought into contact to each other, an energy is applied to the other surface of the substrate of the heat transfer sheet, and the transfer layer corresponding to the region to which the energy has been applied is removed by means of the peel-off layer.

As one of problems that may be caused when a portion of the transfer layer of the intermediate transfer medium or of the transferable protective layer of the protective layer transfer sheet is removed by means of the peel-off layer of the above-described thermal transfer sheet, a problem in which the peel-off layer, which naturally should remain together with the transfer layer or the transferable protective layer that has been removed on the side of the thermal transfer sheet, transfers to the side of the intermediate transfer medium or the protective layer transfer sheet (so called reverse transfer of the peel-off layer) or a problem in which the transfer layer, which should be naturally removed by means of the peel-off layer, remains on the side of the intermediate transfer medium or the protective layer transfer sheet can be included. These problems are likely to occur in the case where adhesiveness between the substrate and the peel-off layer (it may be also referred to as an adhesive property) is low. Under such circumstances, for example, in Patent Literature 4 described above, an embodiment in which adhesiveness between the substrate and the peel-off layer has been improved by using a substrate subjected to easily-adhesive treatment is proposed although no attention is paid to the peel-off property of the transfer layer or the transferable protective layer.

However, responding to a recent demand for accelerating printers, the energy applied to the thermal transfer sheet tends to increase when the transfer layer of an intermediate transfer medium or the transferable protective layer of a protective layer transfer sheet is removed by means of a peel-off layer. In the case where, as the transfer layer of the intermediate transfer medium or the transferable protective layer of the protective layer transfer sheet, a layer having high durability, for example, a thick transfer layer or transferable protective layer is used, it becomes difficult to remove the transfer layer or the transferable protective layer unless the energy to be applied to the thermal transfer sheet is increased. As for thermal transfer sheets having a peel-off layer proposed up to now, the measure in the case where the energy applied to the thermal transfer sheet is increased is not sufficient on removal of a portion of the transfer layer or the transferable protective layer. The peel-off property of the transfer layer of the intermediate transfer medium or the transferable protective layer of the protective layer transfer sheet when a high energy is applied to the thermal transfer sheet leaves room for improvement.

CITATION LIST

Patent Literature

Patent Literature 1: Japanese Patent Laid-Open No. 2015-101019
Patent Literature 2: Japanese Patent Laid-Open No. 2014-80016
Patent Literature 3: Japanese Patent Laid-Open No. 2004-74768
Patent Literature 4: Japanese Patent Laid-Open No. 2003-326865

SUMMARY OF INVENTION

Technical Problem

The present invention has been made in view of such circumstances and aims principally to provide a method for forming a print to be obtained by transferring a transfer layer from which a removal region has been accurately removed onto a transfer receiving article and a method for peeling off a transfer layer by which a removal region of the transfer layer can be accurately removed. The present invention also aims principally to provide a thermal transfer printer which accurately removes a removal region of a transfer layer as well as can transfer the transfer layer from which the removal region has been accurately removed onto a transfer receiving article.

Solution to Problem

The present invention for solving the above problems is a method for forming a print, using a transfer film comprising a transfer layer provided on one surface of a support, a thermal transfer sheet comprising a peel-off layer provided on a substrate, and a transfer receiving article; comprising, removing a removal region of the transfer layer of the transfer film by means of the peel-off layer of the thermal transfer sheet; and transferring the transfer layer, from which the removal region has been removed, onto the transfer receiving article; the method being characterized by: preparing the transfer film in which the transfer layer is provided on one surface of the support; preparing as the thermal transfer sheet (i) a thermal transfer sheet comprising a fusible layer and a peel-off layer provided on the same surface of the substrate or (ii) a first thermal transfer sheet comprising a fusible layer provided on one surface of a first substrate and a second thermal transfer sheet comprising a peel-off layer provided on one surface of a second substrate; transferring the fusible layer onto at least a portion on the removal region of the transfer layer; removing the removal region of the transfer layer by means of the peel-off layer after transferring the fusible layer, and transferring the transfer layer, from which the removal region has been removed, onto the transfer receiving article.

Alternatively, the transfer film may be an intermediate transfer medium in which a transfer layer including a receiving layer is provided on one surface of the support, and wherein before or after removing the removal region a thermally transferable image is formed onto the receiving layer of the transfer film. The thermal transfer sheet prepared in the thermal-transfer sheet preparation may be a thermal transfer sheet in which the peel-off layer, the fusible layer, and a colorant layer are provided on the same surface of the substrate, and wherein forming the thermally transferable image may be to form it onto the receiving layer of the intermediate transfer medium by means of the colorant layer of the thermal transfer sheet.

Alternatively, the transfer film may be a protective layer transfer sheet in which a transfer layer including a protective layer is provided on one surface of the support, and wherein transferring the transfer-layer is to the transfer layer of the protective layer transfer sheet, from which the removal region has been removed, on the transfer receiving article where the thermally transferable image has been formed.

Additionally, the present invention for solving the above problems is a method for peeling off a transfer layer using a transfer film comprising a transfer layer provided on one surface of a support, and a thermal transfer sheet comprising a peel-off layer provided on a substrate; comprising, removing a removal region of the transfer layer of the transfer film by means of the peel-off layer of the thermal transfer sheet; the method being characterized by preparing the transfer film in which the transfer layer is provided on one surface of the support: preparing as the thermal transfer sheet (i) a thermal transfer sheet comprising a fusible layer and the peel-off layer provided on the same surface of the substrate or (ii) a first thermal transfer sheet comprising a fusible layer provided on one surface of a first substrate and a second thermal transfer sheet comprising a peel-off layer provided on one surface of a second substrate; transferring the fusible layer onto at least a portion on the removal region of the transfer layer; and removing the removal region of the transfer layer by means of the peel-off layer after transferring the fusible-layer transfer.

The transfer film may be an intermediate transfer medium in which a transfer layer including a receiving layer is provided on one surface of a support.

Alternatively, the transfer film may be a protective layer transfer sheet in which a transfer layer including a protective layer is provided on one surface of the support.

Advantageous Effects of Invention

According to the method for forming a print of the present invention, a print obtained by transferring a transfer layer from which a removal region has been accurately removed onto a transfer receiving article can be obtained. According to the method for peeling off a transfer layer of the present invention, a removal region of the transfer layer can be accurately removed. According to the thermal transfer printer of the present invention, a removal region of the transfer layer can be accurately removed as well as the transfer layer from which the removal region has been accurately removed can be transferred onto a transfer receiving article.

BRIEF DESCRIPTION OF DRAWINGS

FIGS. 8(a)-8(c) are process steps illustrating a method for forming a print of one embodiment.

DESCRIPTION OF EMBODIMENTS

Figure 1:
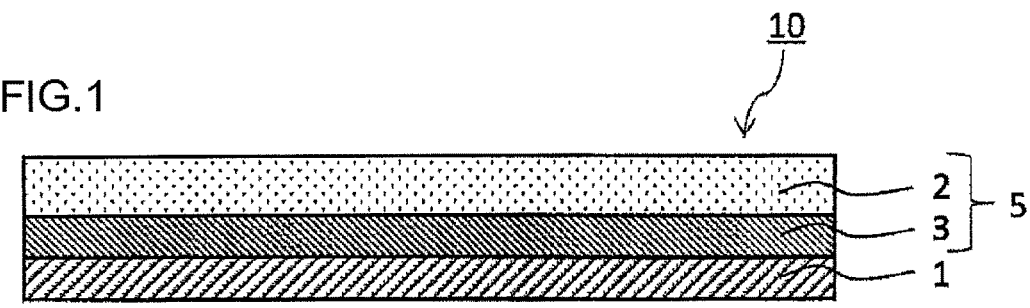
FIG. 1 is a schematic sectional view showing an example of a transfer film used for forming a print of one embodiment.

Embodiments of the present invention now will be described with reference to the drawings and the like. Incidentally, the present invention can be carried out in many different aspects and should not be construed as limited to the contents described in the embodiments illustrated below. In order to make the description clearer, the widths, thicknesses, shapes and the like of the respective parts may be schematically illustrated in the drawings, compared to the actual aspects. However, the schematic illustration is merely an example and does not limit the interpretation of the present invention. Besides, in the specification of the present application and drawings, the elements similar to those described in connection with the preceding drawings, are denoted by the same reference numbers, and a detailed description thereof may be arbitrarily omitted. For convenience of explanation, the term such as upward or downward is used to explain, but the upward and downward directions may be reversed. The same applies to the right and left directions.

«Method for Forming Print»

Figure 4:
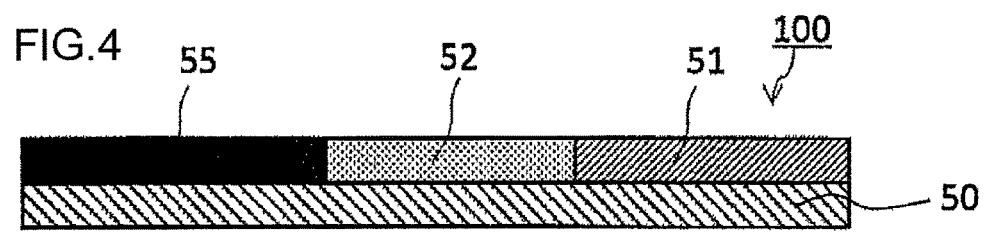
FIG. 4 is a schematic sectional view showing an example of a thermal transfer sheet used for forming a print of one embodiment.
Figure 5A:
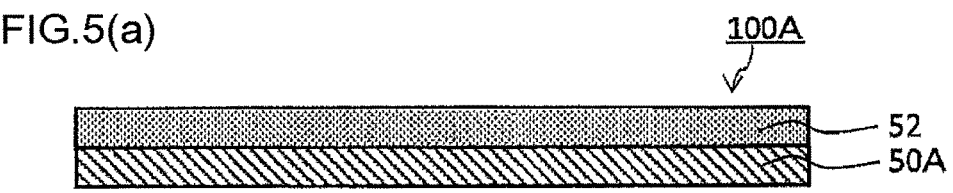
FIGS. 5(a) and (b) are a schematic sectional view showing an example of the thermal transfer sheet used for forming a print of one embodiment.
Figure 5B:
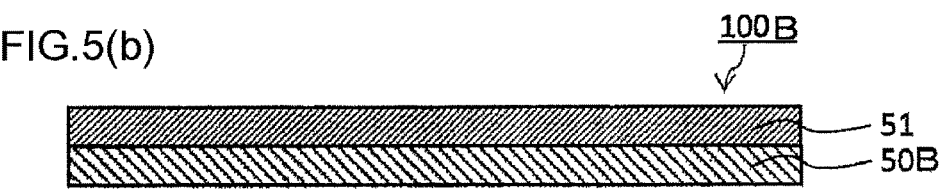
Figure 6A:
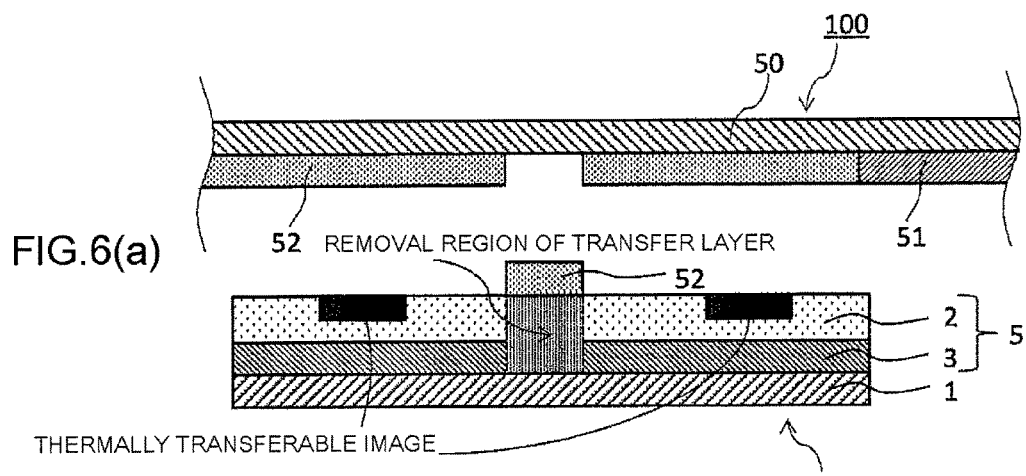
FIGS. 6(a)-6(c) are process steps illustrating a method for forming a print of one embodiment.
Figure 6B:
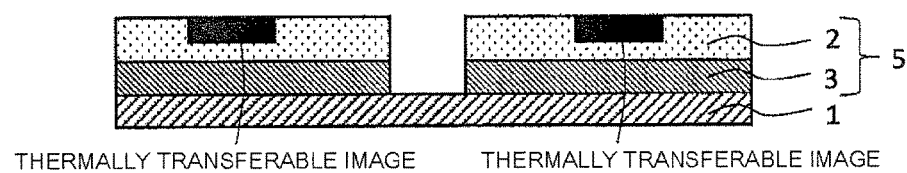
Figure 6C:
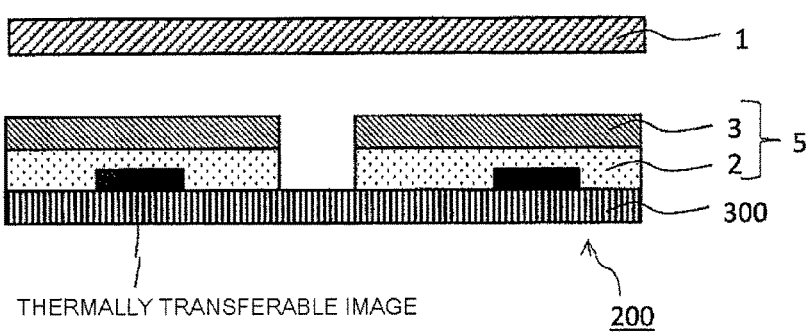
Figure 7A:
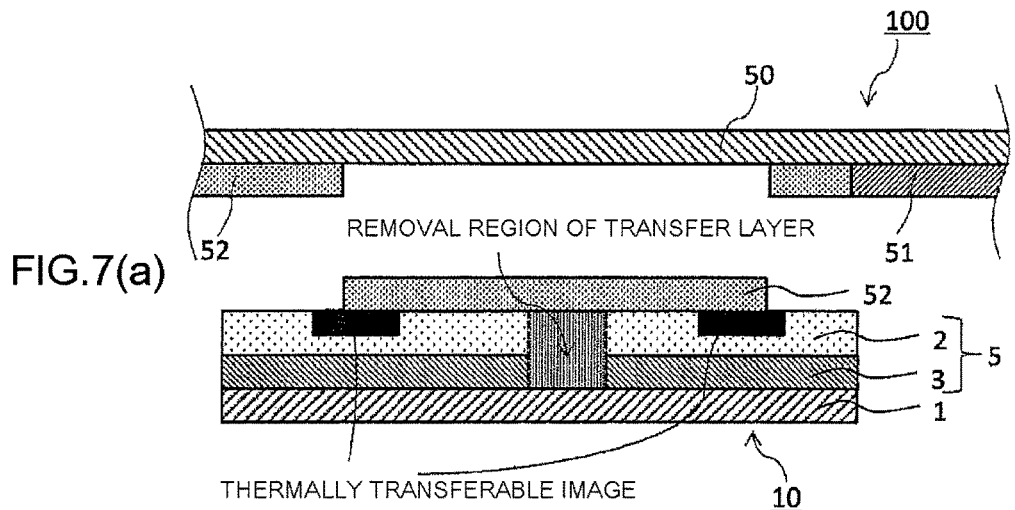
FIGS. 7(a)-7(c) are process steps illustrating a method for forming a print of one embodiment.
Figure 7B:
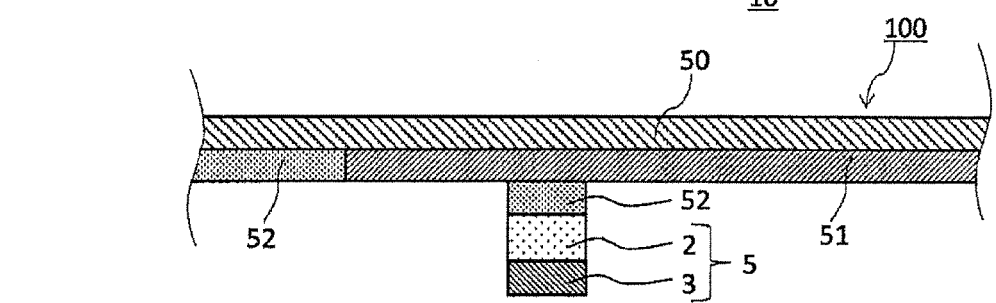
Figure 7C:
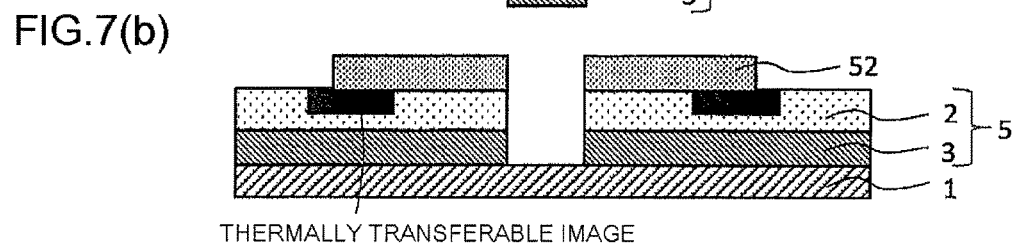

The method for forming a print of one embodiment of the present invention is a method for forming a print 200, comprising, by using a transfer film 10 in which a transfer layer 5 is provided on one surface of a support 1, a thermal transfer sheet 100 in which a peel-off layer 51 is provided on one surface of a substrate 50, and a transfer receiving article 300, a step of removing a removal region of the transfer layer 5 by means of the peel-off layer 51 of the thermal transfer sheet 100 and a step of transferring the transfer layer 5 from which the removal region has been removed onto the transfer receiving article 300, wherein the method is characterized by comprising a transfer-film preparation step of preparing the transfer film 10 in which the transfer layer 5 is provided on one surface of the support 1 (see FIG. 1 and FIG. 2), a thermal-transfer sheet preparation step of preparing (i) the thermal transfer sheet 100 in which a fusible layer 52 and the peel-off layer 51 are provided on the same surface of the substrate 50 (see FIG. 3 and FIG. 4) or (ii) a first thermal transfer sheet 100A in which the fusible layer 52 is provided on one surface of a first substrate 50A (see FIG. 5(a)) and a second thermal transfer sheet 100B in which the peel-off layer 51 is provided on one surface of a second substrate 50B (see FIG. 5(b)), a fusible-layer transfer step of transferring the fusible layer 52 onto at least a portion on the removal region of the transfer layer 5 (see FIG. 6(a), FIG. 7(a), and FIG. 8(a)), a removing step of removing the removal region of the transfer layer 5 by means of the peel-off layer 51 after the fusible-layer transfer step (see FIG. 6(b), FIG. 7(b), and FIG. 8(b)), and a transfer-layer transfer step of transferring the transfer layer 5 from which the removal region has been removed onto the transfer receiving article 300 (see FIG. 6(c), FIG. 7(c), and FIG. 8(c)).

According to the method for forming a print of one embodiment of the present invention, it is possible to make the peel-off property when the removal region of the transfer layer 5 is removed by means of the peel-off layer 51 very satisfactory by transferring the fusible layer 52 onto at least a portion on the removal region of the transfer layer 5 in the stage before removing the removal region of the transfer layer 5 by means of the peel-off layer 51. Specifically, the fusible layer 52 to be transferred onto at least a portion on the removal region of the transfer layer 5 plays an auxiliary role to improve the adhesiveness of the transfer layer 5 to the peel-off layer 51, and by removing the removal region of the transfer layer 5 together with this fusible layer 52 by means of the peel-off layer 51, the peel-off property when the removal region of the transfer layer 5 is removed by means of the peel-off layer 51 can be made satisfactory. According to the method for forming a print of one embodiment of the present invention having such characteristics, a print obtained by transferring a transfer layer 5 from which a removal region has been accurately removed onto a transfer receiving article can be obtained. Each of the steps now will be specifically described.

<Transfer-film Preparation Step>

Figure 2:
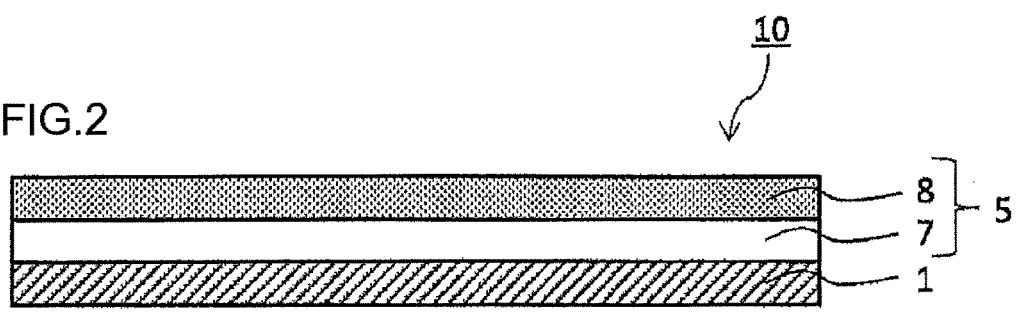
FIG. 2 is a schematic sectional view showing an example of a transfer film used for forming a print of one embodiment.

The transfer-film preparation step is a step of preparing the transfer film 10 in which the transfer layer 5 is provided on one surface of the support 1, as shown in FIG. 1 and FIG. 2. The transfer film 10 used in the method for forming a print of one embodiment of the present invention will be now described with reference to the case where the transfer film 10 is an intermediate transfer medium and the case where the transfer film 10 is a protective layer transfer sheet as examples.

(Transfer Film of First Embodiment (Intermediate Transfer Medium))

As shown in FIG. 1, a transfer film 10 of a first embodiment comprises a support 1 and a transfer layer 5 located on one surface of the support 1, and the transfer layer 5 has a single layer structure composed only of a receiving layer 2 or a layered structure. In the embodiment shown in FIG. 1, the transfer layer 5 has a layered structure in which a peeling layer 3 and a receiving layer 2 are layered in this order. The transfer film 10 of the first embodiment plays a role as a so-called intermediate transfer medium. For example, by using a thermal transfer sheet having a colorant layer, a thermally transferable image is formed on the receiving layer 2 of the intermediate transfer medium as the transfer film 10 of the first embodiment. Then, by transferring the transfer layer 5 including this receiving layer 2 onto an optional transfer receiving article, a print in which the transfer layer 5 including the receiving layer in which the thermally transferable image has been formed on the optional transfer receiving article is located can be obtained. Hereinafter, the transfer film 10 of the first embodiment is referred to as an intermediate transfer medium.

(Support of Intermediate Transfer Medium)

There is no particular limitation with respect to the support 1 of the intermediate transfer medium, and examples can include stretched or unstretched films of a plastic such as polyesters having high heat resistance including polyethylene terephthalate and polyethylene naphthalate, polypropylene, polycarbonate, cellulose acetate, polyethylene derivatives, polyamides, and polymethylpentene. Composite films obtained by laminating two or more of these materials can be also used. The thickness of the support 1 may be appropriately selected depending on the kind of the material used, so that the strength, heat resistance and the like become appropriate. The thickness is usually in the range of 3 μm or more and 30 μm or less, preferably in the range of 4 μm or more and 15 μm or less.

(Transfer Layer of Intermediate Transfer Medium)

The transfer layer 5 of the intermediate transfer medium includes the receiving layer 2, provided that this receiving layer 2 is located farthest of the layers constituting the transfer layer 5 from the support 1. In other words, the receiving layer 2 is located on the outermost surface of the intermediate transfer medium. The transfer layer 5 of the intermediate transfer medium may have a single-layer structure composed only of the receiving layer 2 or may have a layered structure including the receiving layer 2. The transfer layer 5 preferably has a layered structure in which a layer for improving the transferability of the transfer layer 5 and the receiving layer 2 are layered in this order from the side of the support 1. In the embodiment shown in FIG. 1, the transfer layer 5 has a layered structure in which a peeling layer 3 and a receiving layer 2 are layered in this order from the side of the support 1.

(Receiving Layer)

There is no particular limitation with respect to the receiving layer 2 constituting the transfer layer 5 of the intermediate transfer medium, and conventionally-known receiving layers in the field of intermediate transfer media can be appropriately selected and used. Examples of the components of such a receiving layer 2 can include polyolefin type resins such as polypropylene, halogenated resins such as polyvinyl chloride or polyvinylidene chloride, vinyl type resins such as polyvinyl acetate, vinyl chloride-vinyl acetate copolymers, ethylene-vinyl acetate copolymers or polyacrylic esters, polyester type resins such as polyethylene terephthalate or polybutylene terephthalate, polystyrene type resins, polyamide type resins, copolymer type resins of an olefin such as ethylene or propylene and another vinyl polymer, ionomer or cellulose type resins such as cellulose diastase, polycarbonate, and solvent type resins such as acryl type resins. Among them, polyester type resins and vinyl chloride-vinyl acetate copolymers are preferably used, and vinyl chloride-vinyl acetate copolymers are more preferably used. The receiving layer 2 may contain one of these components solely or may contain two or more of these components.

The receiving layer 2 may also contain a release agent together with the resin components described above. Examples of the release agent can include solid waxes such as polyethylene wax, amide wax, and Teflon® powder, fluorine-based or phosphoric acid ester-based surfactants, silicone oils, various modified silicone oils such as reactive silicone oils and curable silicone oils, and various silicone resins.

There is no particular limitation with respect to the thickness of the receiving layer 2, and one example is in the range of 1 µm or more and 10 µm or less.

(Peeling Layer)

The transfer layer 5 of the intermediate transfer medium may include a peeling layer 3 for improving the transferability (it may be referred to as the peelable property) of the transfer layer. In the embodiment shown in FIG. 1, the peeling layer 3 is located nearest of the layers constituting the transfer layer 5 from the support 1. Examples of the components of the peeling layer 3 can include waxes, silicone wax, silicone resins, silicone-modified resins, fluorine resins, fluorine-modified resins, polyvinyl alcohol resins, acryl type resins, polystyrene type resins, thermally cross-linkable epoxy-amino resins, and thermally cross-linkable alkyd-amino resins. The peeling layer 3 may contain one of these components solely or may contain two or more of these components.

There is no particular limitation with respect to the thickness of the peeling layer 3, and one example is in the range of 0.5 µm or more and 5 µm or less.

The intermediate transfer medium as the transfer film of the first embodiment is not limited to the above form, and a conventionally-known intermediate transfer medium can be appropriately selected and used. For example, between the peeling layer 3 and the receiving layer 2, an optional layer such as a protective layer (not shown) may be provided. The transfer layer 5 may be such that the protective layer and the receiving layer 2 are layered in this order from the side of the support 1. Alternatively, an optional layer may be provided between the support 1 and the transfer layer 5. As the protective layer, a protective layer 7 in the transfer film of the second embodiment described later may be appropriately selected and used. Alternatively, a peelable property is imparted to the receiving layer 2, and the transfer layer 5 in the transfer film of the first embodiment can be a single-layer structure composed only of the receiving layer 2. On the other surface of the support 1, a back face layer (not shown) may be provided.

(Transfer Film of Second Embodiment (Protective Layer Transfer Sheet))

As shown in FIG. 2, the transfer film 10 of a second embodiment comprises a support 1 and a transfer layer 5 located on one surface of the support 1, and the transfer layer 5 has a single layer structure including a protective layer 7 or a layered structure. In the embodiment shown in FIG. 2, the transfer layer 5 has a layered structure in which the protective layer 7 and an adhesive layer 8 are layered in this order. The transfer film 10 of the second embodiment plays a role as a so-called protective layer transfer sheet. By transferring the transfer layer 5 including the protective layer 7 onto the transfer receiving article where a thermally transferable image has been formed, a print in which the transfer layer 5 including the protective layer is located on the transfer receiving article where the thermally transferable image has been formed can be obtained. Hereinafter, the transfer film 10 of the second embodiment is referred to as a protective layer transfer sheet.

(Support of Protective Layer Transfer Sheet)

There is no particular limitation with respect to the support 1 of the protective layer transfer sheet, and examples can include various plastic films or sheets such as polyesters such as polyethylene terephthalate, polyarylate, polycarbonate, polyurethane, polyimide, polyether imide, cellulose derivatives, polyethylene, ethylene-vinyl acetate copolymers, polypropylene, polystyrene, acryl, polyvinyl chloride, polyvinylidene chloride, polyvinyl alcohol, polyvinyl butyral, nylon, polyether ether ketone, polysulfone, polyether sulfone, tetrafluoroethylene-perfluoroalkyl vinyl ether copolymers, polyvinyl fluoride, tetrafluoroethylene-ethylene copolymers, tetrafluoroethylene-hexafluoropropylene copolymers, polychlorotrifluoroethylene, and polyvinylidene fluoride. The thickness of the support 1 of the protective layer transfer sheet can be appropriately determined depending on the kind of the material used so as to provide suitable strength and heat resistance. The thickness is usually within the range of 2.5 µm or more and 100 µm or less.

(Transfer Layer of Protective Layer Transfer Sheet)

The condition is that the transfer layer 5 of the protective layer transfer sheet includes the protective layer 7. The transfer layer 5 of the protective layer transfer sheet may have a single-layer structure composed only of the protective layer 7 or may have a layered structure including the protective layer 7. In the embodiment shown, the transfer layer 5 of the protective layer transfer sheet has a layered structure in which the protective layer 7 and the adhesive layer 8 are layered in this order from the side of the support 1.

(Protective Layer)

There is no particular limitation with respect to the protective layer 7 constituting the transfer layer 5 of the protective layer transfer sheet, and conventionally-known protective layers in the field of protective layer transfer sheets can be appropriately selected and used. Examples of the components of the protective layer 7 can include polyester type resins, polycarbonate type resins, acryl type resins, vinyl chloride type resins, ultraviolet absorbing resins, epoxy type resins, polystyrene type resins, polyurethane type resins, acrylic urethane type resins, silicone-modified forms of these resins, any blends of these resins, ionizing radiation curable resins, and ultraviolet absorbing resins. Among them, acryl type resins, polyester type resins, and vinyl chloride type resins are preferably used, and acryl type resins and polyester type resins are more preferably used.

A protective layer containing an ionizing radiation curable resin is particularly excellent in plasticizer resistance and abrasion resistance. As the ionizing radiation curable resin, a known resin can be used, and for example, it is possible to use a resin prepared by crosslinking and curing a radically polymerizable polymer or oligomer by irradiation of ionizing radiation, adding a photopolymerization initiator thereto as required, and causing polymerization and crosslinking by an electron beam or ultraviolet light. A protective layer containing an ultraviolet absorbing resin is excellent in imparting lightfastness to a print.

As an ultraviolet absorbing resin, for example, a resin which is prepared by reacting and linking a reactive ultraviolet absorbing agent to a thermoplastic resin or the ionizing radiation-curable resin described above can be used. More specifically, examples can include those prepared by introducing a reactive group such as an addition-polymerizable double bond (for example, a vinyl group, an acryloyl group, and a methacryloyl group), an alcoholic hydroxyl group, an amino group, a carboxyl group, an epoxy group, and an isocyanate group, into a conventionally-known non-reactive organic ultraviolet absorbing agent such as salicylate series, benzophenon series, benzotriazole series, substituted acrylonitrile series, nikkel-chelate series, and hindered amine series.

(Adhesive Layer)

The transfer layer 5 of the protective layer transfer sheet, as shown in FIG. 2, may include the adhesive layer 8 for improving the adhesiveness between the transfer layer 5 and the transfer receiving article when the transfer layer is transferred onto a transfer receiving article. The adhesive layer 8 is an optional component in the transfer layer 5 of the protective layer transfer sheet and is located farthest of the layers constituting the transfer layer 5 from the support 1. In the case where the above protective layer 7 itself has an adhesive property, it is not particularly required to provide the adhesive layer 8.

Examples of the components of the adhesive layer 8 can include acryl type resins, vinyl chloride type resins, vinyl acetate type resins, vinyl chloride-vinyl acetate copolymers, styrene-acryl copolymers, polyester type resins, and polyamide type resins. The thickness of the adhesive layer 8 is usually within the range of 0.1 μm or more and 5 μm or less.

Between the support 1 and the transfer layer 5, a release layer (not shown) for improving the transferability of the transfer layer 5 may be provided. Examples of the components of the release layer can include waxes, silicone wax, silicone resins, silicone-modified resins, fluorine resins, fluorine-modified resins, polyvinyl alcohol resins, acryl type resins, thermally crosslinkable epoxy-amino resins, and thermally crosslinkable alkyd-amino resins. The thickness of the release layer is usually in the range of 0.05 μm or more and 5 μm or less.

<Thermal-transfer Sheet Preparation Step>

Figure 3:
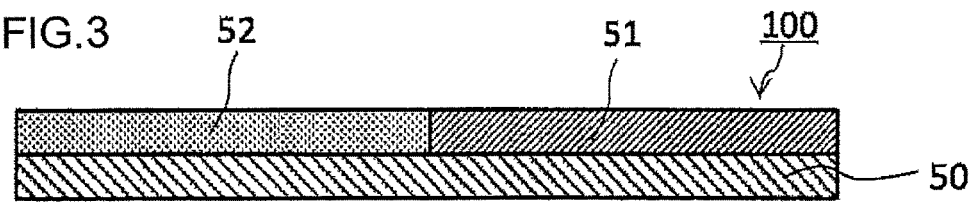
FIG. 3 is a schematic sectional view showing an example of a thermal transfer sheet used for forming a print of one embodiment.

The thermal-transfer sheet preparation step is a step for preparing, as shown in FIG. 3 and FIG. 4, (i) a thermal transfer sheet 100 in which a peel-off layer 51 and a fusible layer 52 are provided on the same surface of a substrate 50, or, as shown in FIG. 5, (ii) a first thermal transfer sheet 100A in which the fusible layer 52 is provided on one surface of a first substrate 50A (see FIG. 5(a)) and a second thermal transfer sheet 100B in which the peel-off layer 51 is provided on one surface of a second substrate 50B (see FIG. 5(b)).

When the thermal transfer sheet 100 of above (i) is used, the fusible-layer transfer step and the removing step described later can be carried out with one thermal transfer sheet 100. In contrast, when the first thermal transfer sheet 100A and the second thermal transfer sheet 100B of above (ii) are used, the fusible-layer transfer step can be carried out with the first thermal transfer sheet 100A, and the removing step can be carried out with the second thermal transfer sheet 100B.

(Substrate)

There is no particular limitation with respect to the substrate 50, and examples can include tissue papers, such as glassine paper, capacitor paper, or paraffin paper, stretched or unstretched films of plastics such as polyesters having high heat resistance including polyethylene terephthalate, polyethylene naphthalate, polybutylene terephthalate, polyphenylene sulfide, polyether ketone, or polyether sulfone, polypropylene, polycarbonate, cellulose acetate, polyethylene derivatives, polyvinyl chloride, polyvinylidene chloride, polystyrene, polyamides, polyimides, polymethylpentene, or ionomers. Composite films obtained by laminating two or more of these materials can be also used. The same applies to the first substrate 50A and the second substrate 50B.

There is no particular limitation with respect to the thickness of substrate 50, and one example is in the range of 2 μm or more 10 μm or less.

(Peel-off Layer)

The peel-off layer 51 is a layer for removing a portion of the transfer layer 5 of the transfer film 10 of the above first embodiment (intermediate transfer medium) or of the transfer layer 5 of the transfer film 10 of the above second embodiment (protective layer transfer sheet). Hereinafter, the removal region of the transfer layer 5 to be removed ultimately by means of the peel-off layer 51 may be herein simply referred to as the "removal region", occasionally.

There is no particular limitation with respect to the components of the peel-off layer 51, and, for example, a conventionally-known thermoplastic resin or the like can be appropriately selected and used. Examples of such a resin can include vinyl chloride resins, vinyl chloride-vinyl acetate copolymers, acryl type resins, polyester resins, polyamide resins, styrene acryl resins, styrene-vinyl chloride-vinyl acetate copolymers, butyral resins, epoxy resins, and polyamide resins. Among them, polyester type resins, vinyl chloride-vinyl acetate copolymers, acryl type resins, mixed resins of a vinyl chloride-vinyl acetate copolymer and an acryl type resin are preferable from the point of a satisfactory peel-off property, and polyester type resins, vinyl chloride-vinyl acetate copolymers, and acryl type resins are particularly preferable. The peel-off layer 51 may contain one resin solely or may contain two or more resins.

There is no particular limitation with respect to the method for forming the peel-off layer 51. The peel-off layer 51 can be formed by preparing a coating liquid for a peel-off layer by adding a resin exemplified as above and additives such as inorganic or organic fillers which are added as required, coating the substrate 50 or an optional layer to be provided on the substrate 50 with this coating liquid for a peel-off layer by a known coating procedure such as gravure coating, gravure reverse coating, and roll coating, and then drying.

There is no particular limitation with respect to the thickness of the peel-off layer 51, and, in consideration of the film strength of the peel-off layer 51, a layer to be brought into contact with the peel-off layer 51, the adhesive property between the peel-off layer 51 and the transfer film 10 and the like, the thickness is preferably in the range of 0.1 µm or more and 4 µm or less, more preferably in the range of 0.2 µm or more and 2 µm or less.

(Fusible Layer)

The fusible layer 52 is a layer to be transferred onto at least a portion on the "removal region" of the transfer layer 5 in the stage before removal of the "removal region" of the transfer layer 5 of the transfer film 10 of the above first embodiment (intermediate transfer medium) or of the transfer layer 5 of the transfer film 10 of the above second embodiment (protective layer transfer sheet) by means of the peel-off layer 51.

The fusible layer 52 is a layer to be transferred onto at least a portion on the "removal region" in the fusible-layer transfer step described later. The fusible layer 52 may be any layer satisfying a condition that the layer fuses or softens by heating and is transferable onto the transfer layer 5. For example, a layer referred to as an "adhesive layer" or "heat seal layer" in the field of protective layer transfer sheets or a layer referred to as a "thermally-fusible ink layer" in the field of thermal transfer sheets can be appropriately selected and used.

Examples of the components of the fusible layer 52 like this include thermally-fusible resins such as ultraviolet absorbing agent copolymers, acryl type resins, epoxy type resins, polyester type resins, polycarbonate type resins, polyamide type resins, ethylene-vinyl acetate copolymers, ethylene-acrylic acid ester copolymers, polyethylene resins, polystyrene resins, polypropylene resins, polybutene resins, petroleum resins, vinyl chloride resins, vinyl chloride-vinyl acetate copolymers, polyvinyl alcohol resins, vinylidene chloride resins, methacryl resins, polyamide resins, fluorine resins, polyvinyl formal resins, polyvinyl butyral resins, acetyl cellulose resins, nitrocellulose resins, polyvinyl acetate resins, polyisobutylene resins and ethyl cellulose, microcrystalline wax, carnauba wax, and paraffin wax. Further examples can include various waxes such as Fischer-Tropsch wax, various low-molecular-weight polyethylene, Japan wax, bees was, spermaceti, insect wax, wool wax, shellac wax, candelilla wax, petrolactum, polyester wax, partially-modified wax, fatty acid esters, and fatty acid amides. Among them, polyester type resins, vinyl chloride-vinyl acetate copolymers, and acryl type resins are preferable, and vinyl chloride-vinyl acetate copolymers are more preferable.

The fusible layer 52 may be a layer having transparency and may be a layer containing a coloring agent and the like and having a predetermined tint.

There is no particular limitation with respect to the thickness of the fusible layer, and the thickness is preferably in the range of 0.1 µm or more and 30 µm or less, more preferably in the range of 1 µm or more and 20 µm or less.

By setting the thickness of the fusible layer 52 to the above preferable thickness, it is possible to further improve the peel-off property when the "removal region" is removed by means of the peel-off layer 51.

(Colorant Layer)

As the thermal transfer sheet 100, as shown in FIG. 4, the thermal transfer sheet 100 in which the peel-off layer 51, the fusible layer 52, and the colorant layer 55 are provided on the same surface of the substrate 50 also can be used. According to this thermal transfer sheet, for example, formation of a thermally transferable image on the receiving layer 2 of the intermediate transfer medium and formation of thermally transferable image on a transfer receiving article can be carried out by means of the colorant layer 55 included in the thermal transfer sheet 100.

The colorant layer 55 contains colorants and a binder resin. Conventionally-known colorants and binder resins in the field of sublimable type thermal transfer sheets can be appropriately selected and used, and a detailed description for them is omitted here. Examples can include conventionally-known yellow colorant layers, magenta colorant layers, and cyan colorant layers in the field of sublimable type thermal transfer sheets. In the embodiment shown, the colorant layer 55 is solely provided on the substrate 50, but a plurality of colorant layers each having a different hue may be provided as being frame sequentially.

The thermal transfer sheet prepared in the thermal-transfer sheet preparation step is not limited to the above form. For example, a back face layer (not shown) may be provided on the opposite face to the face of the substrate 50 on which the peel-off layer 51 and the fusible layer 52 have been formed, and a release layer (not shown) may be provided between the substrate 50 and the fusible layer 52. Alternatively, between the substrate 50 and the peel-off layer 51, a primer layer (not shown) for improving the adhesiveness between the substrate 50 and the peel-off layer 51 may be provided.

<Fusible-layer Transfer Step>

The fusible-layer transfer step is, as shown in FIG. 6(*a*), FIG. 7(*a*), and FIG. 8(*a*), a step of transferring the fusible layer 52 onto at least a portion on the "removal region" to be removed ultimately by means of the peel-off layer 51, by using the transfer film 10 prepared in the above transfer-film preparation step and the above (i) thermal transfer sheet 100 or the above (ii) first thermal transfer sheet 100A prepared in the above thermal-transfer sheet preparation step in combination. Specifically, the fusible-layer transfer step is a step including allowing the transfer layer 5 of the transfer film 10 to oppose to the fusible layer 52 of the thermal transfer sheet 100 or of the first thermal transfer sheet 100A, applying a heat energy to the back face of the thermal transfer sheet by means of a heating device such as a thermal head, and transferring the fusible layer 52 corresponding to the region to which the heat energy has been applied onto at least a portion on the "removal region". Here, in the embodiment shown in each figure, as the thermal transfer sheet, the thermal transfer sheet of the thermal transfer sheet 100 of the above (i) is used. In the embodiments shown in FIG. 6 and FIG. 7, as the transfer film 10, the intermediate transfer medium is used. In the embodiment shown in FIG. 8, as the transfer film 10, the protective layer transfer sheet is used.

The method for forming a print of one embodiment of the present invention is characterized in that the fusible layer has been transferred onto at least a portion on the transfer layer 5 corresponding to the "removal region" in advance when the "removal region" is removed by means of the peel-off layer 51. According to the method for forming a print of one embodiment of the present invention, it is possible to dramatically improve the peel-off property when the "removal region" is removed, compared with the case where the "removal region" is removed by means of the peel-off layer 51 without transferring the fusible layer 52 onto the "removal region".

Figure 9A:
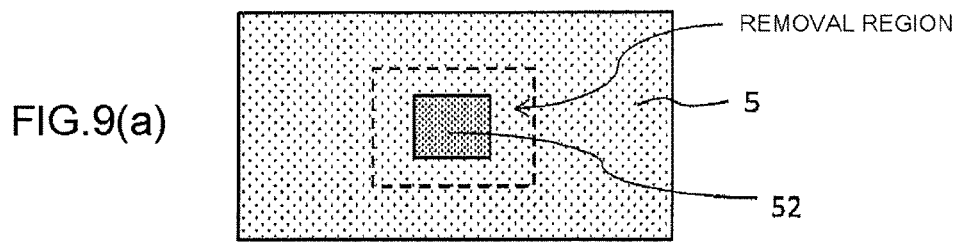
FIGS. 9(a) to (f) are each a view showing a state in which the transfer film onto which the fusible layer has been transferred is seen in a planar view.
Figure 9B:
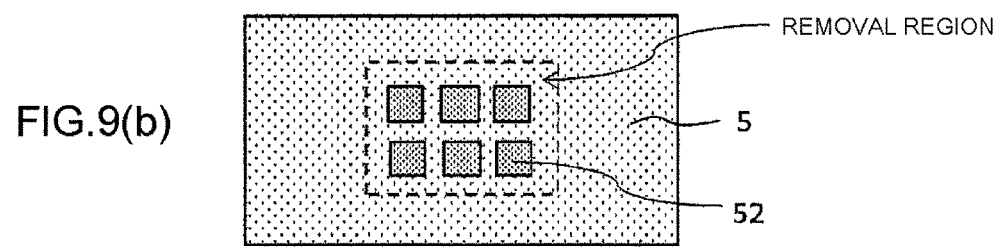
Figure 9C:
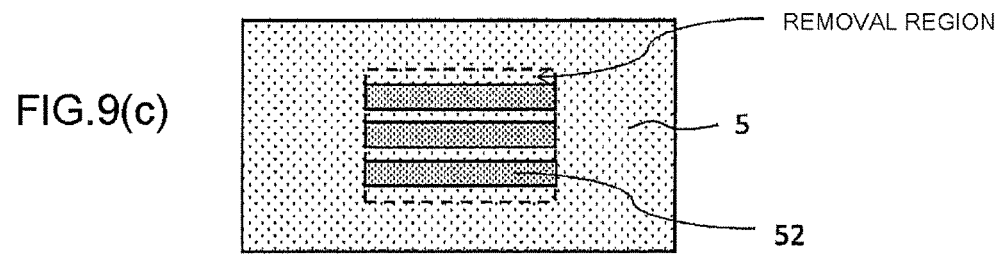
Figure 9D:
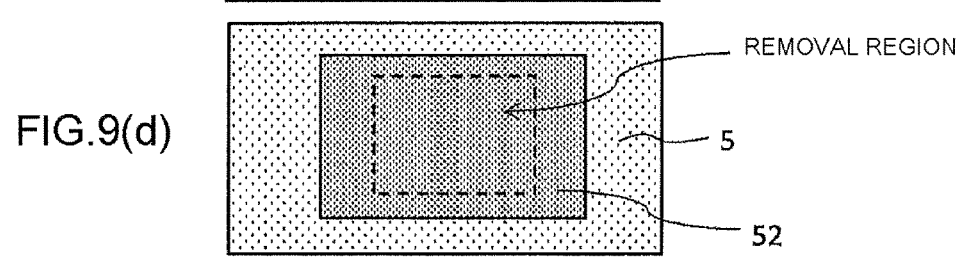
Figure 9E:
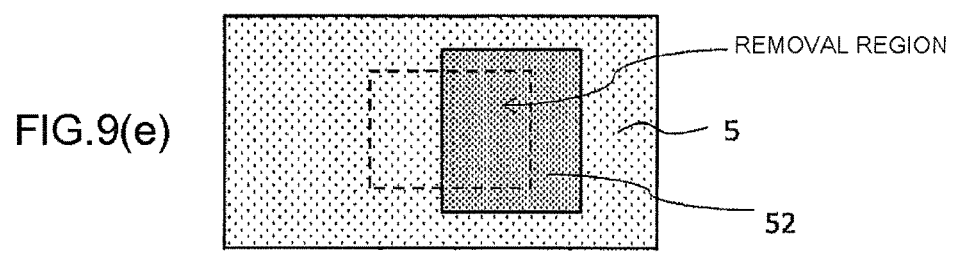
Figure 9F:
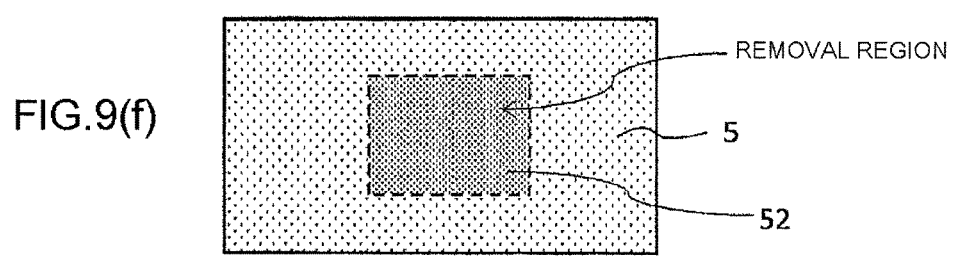

In the embodiment shown in FIG. 6(a), the fusible layer 52 is transferred onto the transfer layer 5 of the intermediate transfer medium 5 so as to be superposed on all of the "removal region" of the transfer layer 5 in the thickness direction and not to protrude outside the "removal region". In the embodiment shown in FIG. 8(a), the fusible layer 52 is transferred onto the transfer layer 5 of the protective layer transfer sheet so as to be superposed on all of the "removal region" of the transfer layer 5 in the thickness direction and not to protrude outside the "removal region". Incidentally, regarding the fusible layer 52, all that is required is that it is transferred onto at least a portion on the "removal region" of transfer layer 5, as shown in FIGS. 9(a) to (c), and there is no particular limitation with respect to the transfer region of the fusible layer 52 as long as the transfer region satisfies this condition. There is also no particular limitation with respect to the transfer pattern of the fusible layer 52. As shown in FIG. 9(b), the fusible layer 52 may be transferred in the form of dots, and as shown in FIG. 9(c), the fusible layer 52 may be transferred in the form of lines. Alternatively, these transfer patterns may be combined. Alternatively, the transfer pattern may be one other than these. As shown in FIGS. 9(d) and (e), the fusible layer 52 may be transferred so as to be superposed on a portion or all of the "removal region" in the thickness direction. In other words, when the transfer film is seen in a planar view from the side of the transfer layer 5, the fusible layer 52 may be transferred so as to cover all or a portion of the "removal region" as well as to bridge a portion or all of the outer edge of the "removal region". In the embodiment shown in FIG. 9(d), when the transfer film is seen in a planar view from the side of the transfer layer 5, the fusible layer 52 is transferred onto the transfer layer 5 so as to cover all of the "removal region" as well as to bridge all of the outer edge of the "removal region". Also, in the embodiment shown in FIG. 9(e), when the transfer film is seen in a planar view from the side of the transfer layer 5, the fusible layer 52 is transferred onto the transfer layer 5 so as to cover a portion of the "removal region" as well as to bridge a portion of the outer edge of the "removal region". Instead of these embodiments, as shown in FIG. 9(f), when the transfer film is seen in a planar view from the side of the transfer layer 5, the fusible layer 52 may be transferred onto the transfer layer 5 such that the fusible layer 52 covers all of the "removal region" as well as that the outer edge of "removal region" corresponds to the outer edge of the fusible layer 52 after transfer. FIGS. 9(a) to (f) are views showing a state in which the transfer film onto which the fusible layer 52 has been transferred is seen in a planar view from the side of the transfer layer 5. The region enclosed by the dotted line is the "removal region". The transfer film onto which the fusible layer 52 of the embodiment shown in FIG. 9 has been transferred may be either of an intermediate transfer medium onto which the fusible layer has been transferred or a protective layer transfer sheet.

In the embodiment shown in FIG. 7(a), the fusible layer 52 is transferred onto the transfer layer 5 of the intermediate transfer medium so as to be superposed on a portion or all of the "removal region" in the thickness direction (in the embodiment shown, all of the "removal region") as well as to protrude outside the "removal region". According to the method for forming a print of the embodiment shown in FIG. 7, it is possible to allow the fusible layer 52 to remain on a print 200 ultimately obtained (see FIG. 7(c)), and it is also possible to improve the designability of the print 200 by use of the remaining fusible layer 52. For example, as described above, by allowing the fusible layer 52 to contain a coloring agent and imparting a predetermined tint to the fusible layer 52, it is also possible to impart high designability to the print 200 by use of the remaining fusible layer 52 on the print 200. In the case where the fusible layer 52 has transparency, no particular problem will be caused even if the fusible layer 52 remains on the print 200.

There is no particular limitation with respect to the proportion of the fusible layer 52 superposed on the "removal region", and irrespective of the proportion, it is possible to improve the peel-off property when the "removal region" is removed by means of the peel-off layer 51 by the amount of the fusible layer 52 transferred. As the portion where the "removal region" of the transfer layer 5 and the fusible layer 52 are superposed is enlarged, the peel-off property when the transfer layer 5 corresponding to the "removal region" is removed by means of the peel-off layer 51 tends to be satisfactory. Considering this point, in the case where the area of the "removal region" when the transfer film 10 is seen in a planar view from the side of the transfer layer 5 is taken as 100%, the area of the portion onto which the fusible layer 52 is superposed in the "removal region" is preferably 10% or more, more preferably close to 100%. Specifically, the area is 50% or more, more preferably 90% or more, particularly preferably 100%. As shown in FIG. 9(d), the embodiment in which the fusible layer 52 is placed so as to be superposed on all of the "removal region" in the thickness direction as well as to protrude outside the "removal region". For example, the fusible layer 52 may be transferred onto the entire surface of the transfer layer 5. Alternatively, the fusible layer 52 may be transferred onto a position which is a portion of the transfer layer 5 as well as is superposed on all of the "removal region".

Figure 11:
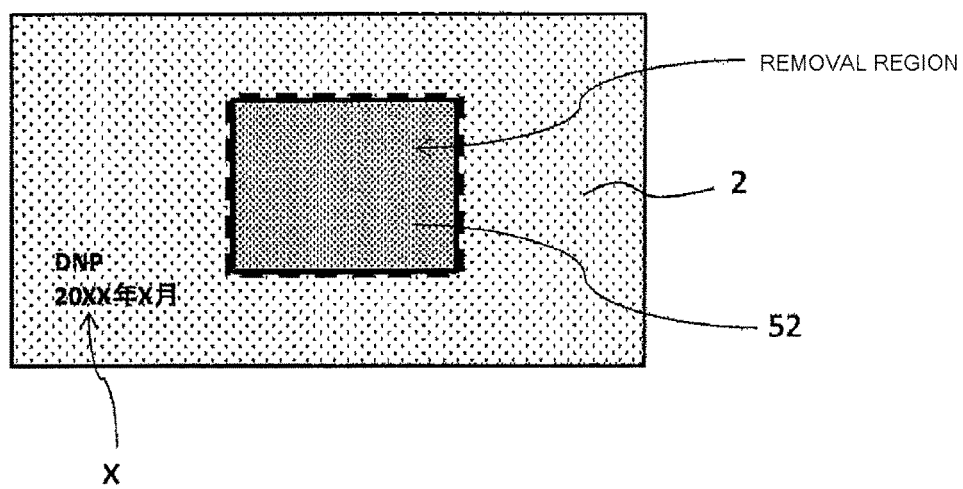
FIG. 11 is a view showing a state in which the transfer film onto which the fusible layer has been transferred is seen in a planar view.

In the case where a fusible layer 52 containing a coloring agent and the like and having a tint is used as the fusible layer 52, as shown in FIG. 11, the fusible layer 52 is transferred onto the "removal region", as well as, a predetermined image (the sign X in the drawing) can be formed by means of the fusible layer 52 having a tint on a region on the transfer layer 5 different from the "removal region". That is, according to the fusible layer 52 having a tint, it is possible to impart a function of improving the peel-off property and a function of forming a predetermined image to the fusible layer 52, and it is possible to carry out transfer of the fusible layer onto the "removal region" and formation of the predetermined image simultaneously in the fusible-layer transfer step. Here, in the embodiment shown in FIG. 11, when the transfer film 10 is seen in a planar view from the side of the transfer layer 5, transfer of the fusible layer 52 onto the transfer layer 5 is carried out such that the fusible layer 52 covers all of the "removal region" as well as that the outer edge of the "removal region" corresponds to the outer edge of the fusible layer 52, but there is no limitation to this embodiment. For example, in various embodiments shown in FIG. 9, the fusible layer 52 can be transferred onto the "removal region". There is no limitation with respect to the type of the predetermined image, and a desired image may be used. Formation of a predetermined image by means of the fusible layer 52 may be carried out additionally in the fusible-layer transfer step or may be carried out after the removing step described later. In any case, in the case where the fusible layer 52 having a tint is used, a predetermined image can be formed without use of a thermal transfer sheet including a separate colorant layer and the like.

There is no particular limitation with respect to the conditions under which the fusible layer 52 is transferred, and for example, in the case where the printing speed is 2 ms/Line (milliseconds/line) and the resistance of the thermal head is of the order of 5200Ω, the printing voltage is preferably set to 15 V or more and 24 V or less. By carrying out transfer of the fusible layer 52 under such conditions, it is possible to further improve the peel-off property by means of the peel-off layer 51 described later.

<Removing Step>

The removing step is, as shown in FIG. 6(b), FIG. 7(b), and FIG. 8(b), a step in which the fusible layer 52 of the thermal transfer sheet 100 is transferred onto at least a portion on the "removal region" and then the "removal region" is removed by means of the thermal transfer sheet 100 or the above (ii) second thermal transfer sheet 100B. Specifically, the removing step is a step including superposing the peel-off layer 51 of the thermal transfer sheet onto the transfer layer 5 of the transfer film 10, applying a heat energy to a region corresponding to the "removal region" on the side of the back face of the thermal transfer sheet by means of a heating device such as a thermal head, and removing the "removal region" corresponding to the region to which the heat energy has been applied together with the fusible layer 52 that has been transferred in advance by means of the peel-off layer 51. The "removal region" of the transfer layer 5 is removed through this step, as shown in FIG. 6(b), FIG. 7(b), and FIG. 8(b).

Figure 10:
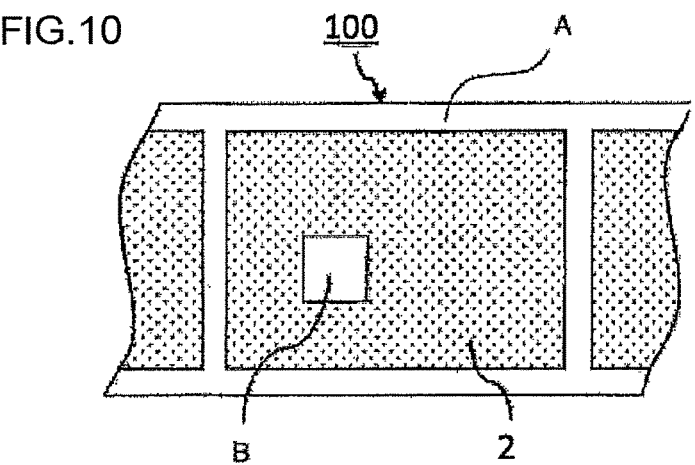
FIG. 10 is a view showing one example of the removal region.

There is no particular limitation with respect to the "removal region" of the transfer layer 5 to be removed by means of the peel-off layer 51, and examples can include the outer circumference part of the transfer layer 5 as shown by the sign A of FIG. 10 and the region in a print ultimately obtained onto which an ancillary product such as an IC chip and a signature space is mounted, that is, the region that causes an disadvantage if the transfer layer 5 is remaining, as shown by the sign B of FIG. 10. In the embodiments as shown in FIG. 6 and FIG. 7, removal of the transfer layer 5 is carried out so as to avoid the thermally transferable image formed on the receiving layer 2, but the region in which the thermally transferable image is formed and the "removal region" may be superposed partially in the thickness direction. That is, a portion of the thermally transferable image may be removed by means of the peel-off layer 51.

(Thermally Transferable Image Formation Step)

The thermally transferable image formation step is a step of forming a thermally transferable image on the receiving layer 2 of the intermediate transfer medium as the transfer film 10 of the first embodiment. Incidentally, in the case where the intermediate transfer medium prepared in the step of preparing the above transfer film 10 is a transfer film in which a thermally transferable image has been formed on the receiving layer 2 in advance, this step is not necessary. In embodiments shown in FIG. 6 and FIG. 7, formation of a thermally transferable image on the receiving layer 2 of the intermediate transfer medium has been carried out in advance.

Formation of a thermally transferable image on the receiving layer 2 of the intermediate transfer medium may be carried out before the removing step or may be carried out after the "removal region" of transfer layer 5 is removed by the removing step. That is, the timing for carrying out formation of the thermally transferable image is not limited in any way.

The thermally transferable image on the receiving layer 2 can be formed by combining the thermal transfer sheet including a colorant layer with the intermediate transfer medium and applying a heat energy from the side of the back face of the thermal transfer sheet by means of a heating member such as a thermal head to transfer the colorant contained in the colorant layer onto the receiving layer. Formation of the thermally transferable image may be carried out, as show in FIG. 4, by means of the thermal transfer sheet 100 in which the peel-off layer 51, the fusible layer 52, and the colorant layer 55 are provided on one surface of the substrate 1, and may be carried out by means of a thermal transfer sheet different from this.

(Transfer-layer Transfer Step)

The transfer-layer transfer step is a step, as shown in FIG. 6(c), FIG. 7(c), and FIG. 8(c), of transferring the transfer layer 5 from which the "removal region" has been removed onto a transfer receiving article 300. A print formed by transferring the transfer layer 5 onto the transfer receiving article 300 is obtained through this step. In the embodiments shown in FIG. 6 and FIG. 7, a print having a thermally transferable image can be obtained by transferring the transfer layer 5 including the receiving layer 2 on which the thermally transferable image has been formed onto the transfer receiving article 300. In the embodiment shown in FIG. 8, a print having a thermally transferable image is obtained by transferring the transfer layer 5 including the protective layer 7 onto the transfer receiving article 300 on which the thermally transferable image has been formed.

The method for forming a print of one embodiment of the present invention has been described hereinabove by referring to specific examples. However, the method for forming a print of one embodiment of the present invention is characterized in that the fusible layer 52 is transferred onto at least a portion on the "removal region" of the transfer layer 5 in advance of removal of the "removal region" of the transfer layer 5 by means of the peel-off layer 51. With respect to characteristics other than this, conventionally-known methods for forming a print can be appropriately selected and used.

For example, a print can be also formed by combining the intermediate transfer medium, which is the transfer film of the first embodiment with the protective layer transfer sheet, which is the transfer film of the second embodiment. Specifically, a print can be also obtained by transferring the transfer layer 5 of the intermediate transfer medium from which the "removal region" has been removed after transfer of the fusible layer 52 was carried out and the transfer layer 5 of the protective layer transfer sheet from which the "removal region" has been removed after transfer of the fusible layer 52 was carried out onto the transfer receiving article.

Alternatively, after a print 200 as shown in FIG. 6(c) and FIG. 7(c) is obtained, by using a conventionally-known protective layer transfer sheet, the transfer layer including the protective layer can be transferred so as to cover all or a portion of the print.

«Method for Forming a Print of Other Embodiment»

The transfer film 10 in which the transfer layer 5 is provided on one surface of the support 1, as an object from which the "removal region" is removed by means of the peel-off layer 51, has been described in the above as an example. A print can be also formed by using a thermal transfer image-receiving sheet in which a receiving layer is provided on one surface of the support, instead of this transfer film 10.

In a method for forming a print of other embodiment, a print of other embodiment can be obtained by preparing a conventionally-known thermal transfer image-receiving sheet in which a receiving layer is provided on one surface of a support, transferring the fusible layer 52 onto at least a portion on the "removal region" of the receiving layer of this thermal transfer image-receiving sheet by using the thermal transfer sheet 100 or the first thermal transfer sheet 100A described above, then, removing the "removal region" of the receiving layer of the thermal transfer image-receiving sheet by means of the peel-off, layer 51, by using the thermal transfer sheet 100 or the second thermal transfer sheet 100B described above, and forming a thermally transferable image on the receiving layer before or after removal of the "removal region" by means of this peel-off layer 51.

Also in the method for forming a print of other embodiment, it is possible to make the peel-off property when the "removal region" of the receiving layer is removed very satisfactory by transferring the fusible layer 52 onto at least a portion on the "removal region" of the receiving layer, in advance of removal of the "removal region" of the receiving layer.

«Method for, Peeling Off Transfer Layer»

Subsequently, a method for peeling off a transfer layer of one embodiment of the present invention will be described. The method for peeling off the transfer layer 5 of one embodiment of the present invention is a method for peeling off a transfer layer comprising a removing step of removing the removal region of the transfer layer 5 of the transfer film 10 by means of the peel-off layer 51 of the thermal transfer sheet 100 by using the transfer film 10 in which the transfer layer 5 is provided on one surface of the support 1 (see FIG. 1) and the thermal transfer sheet 100 in which the peel-off layer 51 is provided on one surface of the substrate 50, wherein the method is characterized by comprising a transfer-film preparation step of preparing the transfer film 10 in which the transfer layer 5 is provided on one surface of the support 1 (see FIG. 1 and FIG. 2), a thermal-transfer sheet preparation step of preparing (i) the thermal transfer sheet 100 in which the fusible layer 52 and the peel-off layer 51 are provided on the same surface of the substrate 50 (see FIG. 3 and FIG. 4) or (ii) a first thermal transfer sheet 100A in which the fusible layer 52 is provided on one surface of a first substrate 50A (see FIG. 5(a)) and a second thermal transfer sheet 100B on which the peel-off layer 51 is provided on one surface of a second substrate 50B (see FIG. 5(b)), a fusible-layer transfer step of transferring the fusible layer 52 onto at least a portion of the removal region of the transfer layer 5, and a removing step of removing the removal region of the transfer layer 5 by means of the peel-off layer 51 after the fusible-layer transfer step.

According to the method for peeling off a transfer layer of one embodiment of the present invention, by means of the fusible layer 52 to be transferred onto the "removal region", it is possible to make the peel-off property when the "removal region" of the transfer layer 5 is transferred very satisfactory and it is possible to accurately remove the "removal region" of the transfer layer 5.

The method for peeling off a transfer layer of one embodiment of the present invention is as described in the method for forming a print described above except that the thermally transferable image formation step and the transfer-layer transfer step are not essential constituents, and a detailed description for the method is omitted here.

«Thermal Transfer Printer»

Figure 12:
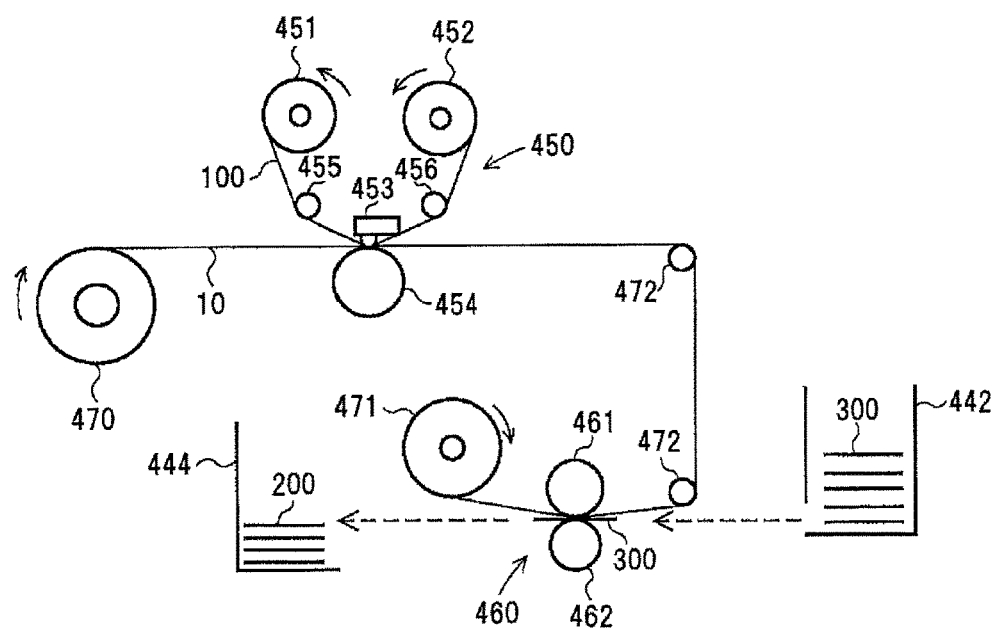
FIG. 12 is a schematic configuration diagram of the thermal transfer printer of one embodiment.

Subsequently, a thermal transfer printer of one embodiment of the present invention will be described. The thermal transfer printer of one embodiment of the present invention comprises, as shown in FIG. 12, a first feeding unit 470 for feeding a transfer film 10 in which a transfer layer 5 is provided on one surface of a support 1, a second feeding unit 451 for feeding a thermal transfer sheet 100 in which a peel-off layer 51 and a fusible layer 52 are provided on the same surface of a substrate 50, a printing unit 450 for heating the thermal transfer sheet 100, transferring the fusible layer 52 onto at least a portion of a removal region of the transfer layer 5, and after transfer of the fusible layer 52, removing the removal region of the transfer layer 5 by means of the peel-off layer 51, a third feeding unit 442 for feeding a transfer receiving article 300, and a transfer unit 460 for transferring the transfer layer 5 from which the removal region has been removed onto the transfer receiving article 300. Incidentally, FIG. 12 is a schematic configuration diagram showing an example of the thermal transfer printer of one embodiment of the present invention, and the support 1 and the transfer layer 5 in the transfer film 10 are not shown. Additionally, the substrate 50, the peel-off layer 51, and the fusible layer 52 in the thermal transfer sheet 100 are not shown.

In the first feeding unit 470 of the thermal transfer printer of the embodiment shown, a wound product prepared by winding the transfer film 10 in the shape of a ribbon is loaded. The first feeding unit 470 rotates the wound product of the transfer film 10 to carry the transfer film 10 in a long strip form to the printing unit 450 and the transfer unit 460.

The printing unit 450 of the thermal transfer printer of the embodiment shown comprises a thermal head 453, a rotatably-driven platen roll 454 provided in the lower side of the thermal head 453, and a raising and lowering device (not shown) for freely raising and lowering the thermal head 453 against the platen roll 454. In the thermal transfer printer of the embodiment shown, the transfer film 10 fed from the first feeding unit 470 passes between the thermal head 453 and the platen roll 454.

Additionally, in the thermal transfer printer of the embodiment shown, the thermal transfer sheet 100 passes between the thermal head 453 and the platen roll 454 via a guide roll 455 from the side of a feeding roll as the second feeding unit 451, and is wound around a winder roll 452 via a guide roll 456. Between the thermal head 453 and the platen roll 454, the fusible layer 52 of the thermal transfer sheet 100 and the peel-off layer 51 are opposed to the transfer layer 5 of the transfer film 10 (not shown).

In the thermal transfer printer of the embodiment shown, the thermal head 453 heats the fusible layer 52 of the thermal transfer sheet 100 and transfers the fusible layer 52 corresponding to the removal region onto the transfer layer 5. The thermal transfer printer of the embodiment shown aligns the transfer film 10 with the fusible layer 52 of the thermal transfer sheet 100, then lowers the thermal head 453 toward the platen roll 454, and allows the thermal head 453 to abut on the platen roll 454 via the thermal transfer sheet 100 and the transfer film 10. Also, the platen roll 454 is rotatably driven to carry the thermal transfer sheet 100 and the transfer film 10 to the downstream side. Meanwhile, the thermal head 453 selectively heats the fusible layer 52 of the thermal transfer sheet 100 based on the data transmitted to the thermal head 453. Thereby, the fusible layer 52 is transferred onto at least a portion on the removal region of the transfer layer 5.

Incidentally, in the case where the fusible layer 52 is used also for formation of the thermally transferable image (see FIG. 11), transfer of fusible layer 52 onto the removal region can be carried out in conjunction with formation of the thermally transferable image by synthesizing the image pattern data of the thermally transferable image and the transfer pattern data of the fusible layer to be transferred onto the removal region, and transmitting the synthesized data to the thermal head 453.

The thermal head 453 also heats the peel-off layer 51 of the thermal transfer sheet 100 and removes the removal region of the transfer layer 5 together with the fusible layer 52 previously transferred. The thermal transfer printer of the embodiment shown raises the thermal head 453 after transfer of the fusible layer 52 and aligns the transfer film 10 with the peel-off layer 51 of the thermal transfer sheet 100. Subsequently, the printer lowers the thermal head 453 toward the platen roll 454, and allows the thermal head 453 to abut on the platen roll 454 via the thermal transfer sheet 100 and the transfer film 10. Then, the printer rotatably drives the platen roll 454 to carry the thermal transfer sheet 100 and the transfer film 10 to the downstream side. Meanwhile, the thermal head 453 selectively heats the peel-off layer 51 of the thermal transfer sheet 100 based on the removal region data transmitted to the thermal head 453. Thereby, the removal region of the transfer layer 5 is removed together with the fusible layer 52 previously transferred.

The thermal transfer printer of the embodiment shown also carries the transfer film 10 from which the removal region of the transfer layer 5 has been removed to the transfer unit 460 via the guide roll 472. In the thermal transfer printer of the embodiment shown, the transfer unit 460 comprises a heat roller 461 and a pressure roll 462 provided below the heat roller 461. The transfer unit 460 transfers the transfer layer 5 from which the removal region has been removed onto the transfer receiving article 300 fed from the third feeding unit 442.

In the thermal transfer printer of the embodiment shown, the third feeding unit 442 has a delivery apparatus that delivers a sheet-like transfer receiving article 300 one by one in response to carrying of the transfer film 10, a conveyor apparatus that carries the delivered transfer receiving article 300 and the like. Incidentally, the transfer receiving article 300 may be a long wound one.

The transfer unit 460 heats the transfer layer face of the transfer film 10 superposed on the transfer receiving article 300 between the heat roller 461 and the pressure roll 462. Thereby, a print 200 formed by transferring the transfer layer 5 from which the removal region has been removed onto the transfer receiving article 300 (hereinafter, it is referred to as a print.) is obtained.

In the thermal transfer printer of the embodiment shown, the print 200 is carried to an ejecting unit 444 and accumulated one by one. Incidentally, the transfer film 10 of which the transfer layer 5 has been transferred is wound around a winder roll 471.

According to the thermal transfer printer of one embodiment of the present invention described above, a removal region of the transfer layer can be accurately removed as well as the transfer layer from which the removal region has been accurately removed can be transferred onto a transfer receiving article.

Alternatively, it is possible to form a thermally transferable image by using the thermal transfer sheet 100 in which the peel-off layer 51, the fusible layer 52, and the colorant layer 55 are provided on the same surface of the substrate 50 (see FIG. 4), the transfer film 10 comprising the transfer layer 5 including the receiving layer 2 (see FIG. 1), and the thermal transfer printer of one embodiment of the present invention in combination, and transferring the colorants of the colorant layer 55 onto the receiving layer 2 constituting the transfer layer 5 before or after transfer of the fusible layer 52. In this case, the thermal transfer printer of one embodiment of the present invention aligns the transfer film 10 with the colorant layer 55 of the thermal transfer sheet 100, lowers the thermal head 453 toward the platen roll 454, and allows the thermal head 453 to abut on the platen roll 454 via the thermal transfer sheet 100 and the transfer film 10. Then, the printer rotatably drives the platen roll 454 to carry the thermal transfer sheet 100 and the transfer film 10 to the downstream side. Meanwhile, the thermal head 453 selectively heats the region of the colorant layer 55 of the thermal transfer sheet 100 based on the image data transmitted to the thermal head 453, and transfers the colorants of the colorant layer 55 from the thermal transfer sheet 100 onto the receiving layer 2 constituting the transfer layer 5. Thereby, formation of the thermally transferable image is carried out onto the transfer layer 5.

EXAMPLES

The present invention now will be described more specifically by referring to examples. Unless otherwise specified below, the part is based on the mass.

(Production of Thermal Transfer Sheet Having Peel-off Layer)

Using a polyethylene terephthalate film having a thickness of 6 μm as the substrate, one surface of the substrate was coated with a coating liquid for a peel-off layer having the following composition so as to obtain a thickness of 1 μm in the dried state (coating amount 1 g/m$^2$) and dried to thereby form a peel-off layer. Additionally, the other surface of the substrate was coated with a coating liquid for a back face layer having the following composition so as to obtain a thickness of 0.8 μm in the dried state (coating amount 0.8 g/m$^2$) and dried to form a back face layer, and then, a thermal transfer sheet having the peel-off layer was obtained.

| <Coating liquid for peel-off layer> | |
| --- | --- |
| Vinyl chloride-vinyl acetate copolymers (SOLBIN (R) C5R, Nissin Chemical Industry Co., Ltd.) | 10 parts |
| Acryl type resin (Dianal (R) BR-83, MITSUBISHI RAYON CO., LTD.) | 10 parts |
| Methyl ethyl ketone (MEK) | 80 parts |

| <Coating liquid for back face layer> | |
| --- | --- |
| Polyvinyl butyral resin (S-LEC (R) BX-1, SEKISUI CHEMICAL CO., LTD.) | 2 parts |
| Polyisocyanate (BURNOCK (R) D750, DIC CORPORATION) | 9.2 parts |
| Phosphoric acid ester-based surfactant (PLYSURF (R) A208N, DKS Co. Ltd.) | 1.3 parts |
| Talc (MICRO ACE (R) P-3, NIPPON TALC Co., Ltd.) | 0.3 parts |
| Toluene | 43.6 parts |
| Methyl ethyl ketone | 43.6 parts |

(Production of Thermal Transfer Sheet (1))

Using a polyethylene terephthalate film having a thickness of 6.0 μm as the substrate, one surface of the substrate was coated with a coating liquid for a release layer having the following composition so as to obtain a thickness of 0.2 μm in the dried state (coating amount 0.2 g/m$^2$) and dried to thereby form a release layer. Subsequently, the release layer was coated with a coating liquid for a fusible layer 1 having the following composition so as to obtain a thickness of 1 µm in the dried state (coating amount 1 g/m$^2$) and dried to form a fusible layer, and then a thermal transfer sheet (1) was obtained.

| <Coating liquid for release layer> | |
|---|---|
| Urethane type resin | 25 parts |
| Polyvinyl acetal resin | 75 parts |
| (S-LEC (R) KS-5, SEKISUI CHEMICAL CO., LTD.) | |
| Toluene | 950 parts |
| Isopropyl alcohol | 950 parts |

| <Coating liquid for fusible layer 1> | |
|---|---|
| Vinyl chloride-vinyl acetate copolymer | 40 parts |
| (SOLBIN (R) CNL, Nissin Chemical Industry Co., Ltd.) | |
| Methyl ethyl ketone | 25 parts |
| Toluene | 25 parts |

(Production of Thermal Transfer Sheet (2))

A thermal transfer sheet (2) was obtained totally in the same manner as in Production of thermal transfer sheet (1) except that no release layer was formed between the substrate and the fusible layer.

(Production of Thermal Transfer Sheet (3))

A thermal transfer sheet (3) was obtained totally in the same manner as in Production of thermal transfer sheet (1) except that a coating liquid for a fusible layer 2 having the following composition was used instead of the coating liquid for a fusible layer 1.

| <Coating liquid for fusible layer 2> | |
|---|---|
| Acryl type resin (Tg: 105° C., Mw: 25000) | 20 parts |
| (Dianal (R) BR-87, MITSUBISHI RAYON CO., LTD.) | |
| Vinyl chloride-vinyl acetate copolymer | 20 parts |
| (SOLBIN (R) CNL, Nissin Chemical Industry Co., Ltd.) | |
| Methyl ethyl ketone | 25 parts |
| Toluene | 25 parts |

(Production of Thermal Transfer Sheet (4))

A thermal transfer sheet (4) was obtained totally in the same manner as in Production of thermal transfer sheet (1) except that a coating liquid for a fusible layer 3 having the following composition was used instead of the coating liquid for a fusible layer 1.

| <Coating liquid for fusible layer 3> | |
|---|---|
| Acryl type resin (Tg: 105° C., Mw: 25000) | 40 parts |
| (Dianal (R) BR-87, MITSUBISHI RAYON CO., LTD.) | |
| Methyl ethyl ketone | 25 parts |
| Toluene | 25 parts |

(Production of Thermal Transfer Sheet (5))

A thermal transfer sheet (5) was obtained totally in the same manner as in Production of thermal transfer sheet (1) except that a coating liquid for a fusible layer 4 having the following composition was used instead of the coating liquid for a fusible layer 1.

| <Coating liquid for fusible layer 4> | |
|---|---|
| Carbon black dispersion (solid content 46%) | 100 parts |
| (carbon black: 40%, dispersant: 6%, methyl ethyl ketone: 27%, toluene: 27%) | |
| Vinyl chloride-vinyl acetate copolymer | 40 parts |
| (SOLBIN (R) CNL, Nissin Chemical Industry Co., Ltd.) | |
| Methyl ethyl ketone | 25 parts |
| Toluene | 25 parts |

(Production of Thermal Transfer Sheet (6))

A thermal transfer sheet (6) was obtained totally in the same manner as in Production of thermal transfer sheet (1) except that a coating liquid for a fusible layer 5 having the following composition was used instead of the coating liquid for a fusible layer 1.

| <Coating liquid for fusible layer 5> | |
|---|---|
| Titanium oxide dispersion (solid content 46%) | 100 parts |
| (titanium oxide: 40%, dispersant: 6%, methyl ethyl ketone: 27%, toluene: 27%) | |
| Vinyl chloride-vinyl acetate copolymer | 40 parts |
| (SOLBIN (R) CNL, Nissin Chemical Industry Co., Ltd.) | |
| Methyl ethyl ketone | 25 parts |
| Toluene | 25 parts |

(Production of Thermal Transfer Sheet (7))

A thermal transfer sheet (7) was obtained totally in the same manner as in Production of thermal transfer sheet (1) except that a coating liquid for a fusible layer 6 having the following composition was used instead of the coating liquid for a fusible layer 1.

| <Coating liquid for fusible layer 6> | |
|---|---|
| Yellow pigment dispersion (solid content 46%) | 100 parts |
| (Disperse Yellow 54: 40%, dispersant: 6%, methyl ethyl ketone: 27%, toluene: 27%) | |
| Vinyl chloride-vinyl acetate copolymer | 40 parts |
| (SOLBIN (R) CNL, Nissin Chemical Industry Co., Ltd.) | |
| Methyl ethyl ketone | 25 parts |
| Toluene | 25 parts |

(Production of Intermediate Transfer Medium)

Using a polyethylene terephthalate film having a thickness of 16 µm as the substrate, the substrate was coated with a coating liquid for a peeling layer having the following composition so as to obtain a thickness of 1 µm in the dried state (coating amount 1 g/m$^2$) and dried to thereby form a peeling layer. Subsequently, the peeling layer was coated with a coating liquid for a protective layer having the following composition so as to obtain a thickness of 2 µm in the dried state (coating amount 2 g/m$^2$) and dried to thereby form a protective layer. Additionally, the protective layer was coated with a coating liquid for a receiving layer having the following composition so as to obtain a thickness of 1.5 µm in the dried state (coating amount 1.5 g/m$^2$) and dried to form a receiving layer, and then an intermediate transfer medium in which the peeling layer, the protective layer, and the receiving layer were layered in this order on the substrate was obtained.

| <Coating liquid for peeling layer> | |
|---|---|
| Acryl resin | 29 parts |
| (Dianal (R) BR-87, MITSUBISHI RAYON CO., LTD.) | |

-continued

<Coating liquid for peeling layer>

| | |
|---|---|
| Polyester resin (Vylon (R) 200, TOYOBO CO., LTD.) | 1 part |
| Methyl ethyl ketone | 35 parts |
| Toluene | 35 parts |

<Coating liquid for protective layer>

| | |
|---|---|
| Polyester resin (Vylon (R) 200, TOYOBO CO., LTD.) | 30 parts |
| Methyl ethyl ketone | 35 parts |
| Toluene | 35 parts |

<Coating liquid for receiving layer>

| | |
|---|---|
| Vinyl chloride-vinyl acetate copolymer (SOLBIN (R) CNL, Nissin Chemical Industry Co., Ltd.) | 20 parts |
| Silicone oil (X-22-3000T, Shin-Etsu Chemical Co., Ltd.) | 1 part |
| Methyl ethyl ketone | 79 parts |

(Production of Protective Layer Transfer Sheet)

A protective layer transfer sheet in which a peeling layer and a protective layer were layered in this order on the substrate was obtained totally in the same manner as in Production of intermediate transfer medium described above except that no receiving layer was formed on the protective layer in Production of intermediate transfer medium described above.

Example 1

The intermediate transfer medium and the thermal transfer sheet (1) produced above were combined. The fusible layer of the thermal transfer sheet (1) was transferred onto the receiving layer of the intermediate transfer medium by applying a 255/255 gray scale energy using the following printer. Subsequently, the intermediate transfer medium in which the fusible layer was transferred and the thermal transfer sheet having the peel-off layer produced above were combined. A partial region of the transfer layer in which the peeling layer, the protective layer, and the receiving layer were layered in this order (hereinafter, a partial region of the transfer layer is referred to as a "predetermined region") was removed together with the above fusible layer by applying a 255/255 gray scale energy using the following printer. Incidentally, transfer of the fusible layer was carried out such that the entire surface of the "predetermined region" was covered.

Additionally, the protective layer transfer sheet and the thermal transfer sheet (1) produced above in the same manner as described above were combined. The fusible layer was transferred onto the protective layer of the protective layer transfer sheet by applying a 255/255 gray scale energy using the following printer. Subsequently, the protective layer transfer sheet in which the fusible layer had been transferred and the thermal transfer sheet having the peel-off layer produced above were combined. The predetermined region of the transfer layer in which the peeling layer and the protective layer had been layered was removed together with the above fusible layer by applying a 255/255 gray scale energy using the following printer. Incidentally, transfer of the fusible layer was carried out such that the entire surface of the "predetermined region" was covered.

(Printer)

Thermal head: KEE-57-12GAN2-STA (manufactured by KYOCERA Corporation)
Heater average resistance: 3303 (Ω)
Main scanning direction printing density: 300 (dpi)
Sub scanning direction printing density: 300 (dpi)
One line cycle: 2.0 (msec)
Printing start temperature: 35 (° C.)
Pulse-duty ratio: 85%
Printing voltage: 18 (V)

Examples 2 to 7

Removal of the intermediate transfer medium and the transfer layer of the protective layer transfer sheet produced above was carried out totally in accordance with the same method as in Example 1 by using a thermal transfer sheet shown in the following Table 1 instead of the thermal transfer sheet (1).

Example 8

Removal of the intermediate transfer medium and the transfer layer of the protective layer transfer sheet produced above was carried out totally in the same manner as in Example 1 except that the fusible layer was transferred so as to be superposed on 10% of the surface of the above "predetermined region" (see FIG. 9(a)).

Example 9

Removal of the intermediate transfer medium and the transfer layer of the protective layer transfer sheet produced above was carried out totally in the same manner as in Example 1 except that the fusible layer was transferred so as to be superposed on 50% of the surface of the above "predetermined region" (see FIG. 9(a)).

Example 10

Removal of the intermediate transfer medium and the transfer layer of the protective layer transfer sheet produced above was carried out totally in the same manner as in Example 1 except that the fusible layer was transferred so as to cover all the surface of the above "predetermined region" as well as to protrude outside the "predetermined region" (see FIG. 9(d)).

Comparative Example 1

Removal of the intermediate transfer medium and the transfer layer of the protective layer transfer sheet produced above was carried out totally in the same manner as in Example 1 except that no fusible layer was transferred.

<Evaluation of Peel-off Property>

Evaluation of the peel-off property was carried out based on the following evaluation criteria by visually checking the intermediate transfer medium and the protective layer transfer sheet from which the "predetermined region" had been removed in accordance with the methods of Examples 1 to 10 and Comparative Example 1. Evaluation results are also shown in Table 1.

"Evaluation Criteria"

A . . . The transfer layer corresponding to the "predetermined region" has been accurately removed.

B . . . A slight portion of the transfer layer corresponding to the "predetermined region" remains, or the transfer layer has been removed slightly out of the "predetermined region", but it does not cause any problem during use.
NG . . . The transfer layer corresponding to the "predetermined region" has not been accurately removed, and thus, the peel-off property is poor.

TABLE 1

|  | Thermal transfer sheet having a thermally fusible layer | Peel-off property | |
|---|---|---|---|
|  |  | Intermediate transfer medium | Protective layer transfer sheet |
| Example 1 | Thermal transfer sheet (1) | A | A |
| Example 2 | Thermal transfer sheet (2) | A | A |
| Example 3 | Thermal transfer sheet (3) | A | A |
| Example 4 | Thermal transfer sheet (4) | B | B |
| Example 5 | Thermal transfer sheet (5) | A | A |
| Example 6 | Thermal transfer sheet (6) | A | A |
| Example 7 | Thermal transfer sheet (7) | A | A |
| Example 8 | Thermal transfer sheet (1) | B | B |
| Example 9 | Thermal transfer sheet (1) | B | B |
| Example 10 | Thermal transfer sheet (1) | A | A |
| Comparative Example 1 | — | NG | NG |

REFERENCE SIGNS LIST

1 support
2 receiving layer
3 peeling layer
5 transfer layer
7 protective layer
8 adhesive layer
10 transfer film, intermediate transfer medium, protective layer transfer sheet
50 substrate
50A first substrate
50B second substrate
51 peel-off layer
52 fusible layer
55 colorant layer
100 thermal transfer sheet
100A first thermal transfer sheet
100B second thermal transfer sheet
200 print
300 transfer receiving article
A peripheral edge of transfer layer
B area on which an IC chip is to be placed

The invention claimed is:

1. A method for forming a print, using a transfer film comprising a transfer layer provided on one surface of a support, a thermal transfer sheet comprising a peel-off layer provided on a substrate, and a transfer receiving article; comprising, removing a removal region of the transfer layer of the transfer film by means of the peel-off layer of the thermal transfer sheet; and transferring the transfer layer, from which the removal region has been removed, onto the transfer receiving article; the method being characterized by:

preparing the transfer film in which the transfer layer is provided on one surface of the support;

preparing as the thermal transfer sheet (i) a thermal transfer sheet comprising a fusible layer and a peel-off layer provided on the same surface of the substrate or (ii) a first thermal transfer sheet comprising a fusible layer provided on one surface of a first substrate and a second thermal transfer sheet comprising a peel-off layer provided on one surface of a second substrate;

transferring the fusible layer onto at least a portion on the removal region of the transfer layer;

removing the removal region of the transfer layer by means of the peel-off layer after transferring the fusible layer, and transferring the transfer layer, from which the removal region has been removed, onto the transfer receiving article.

2. The method for forming a print according to claim 1, wherein the transfer film is an intermediate transfer medium in which the transfer layer comprises a receiving layer provided on one surface of the support, and wherein before or after removing the removal region a thermally transferable image is formed onto the receiving layer of the transfer film.

3. The method for forming a print according to claim 2, wherein the thermal transfer sheet prepared in the thermal-transfer sheet preparation is a thermal transfer sheet in which the peel-off layer, the fusible layer, and a colorant layer are provided on the same surface of the substrate, and wherein forming the thermally transferable image is to form it onto the receiving layer of the intermediate transfer medium by means of the colorant layer of the thermal transfer sheet.

4. The method for forming a print according to claim 1, wherein the transfer film is a protective layer transfer sheet in which a transfer layer comprising a protective layer is provided on one surface of the support, and wherein transferring the transfer-layer, is to transfer the transfer layer of the protective layer transfer sheet, from which the removal region has been removed, on the transfer receiving article where a thermally transferable image has been formed.

5. A method for peeling off a transfer layer, using a transfer film comprising a transfer layer provided on one surface of a support, and a thermal transfer sheet comprising a peel-off layer provided on a substrate; comprising, removing a removal region of the transfer layer of the transfer film by means of the peel-off layer of the thermal transfer sheet;

the method being characterized by preparing the transfer film in which the transfer layer is provided on one surface of the support:

preparing as the thermal transfer sheet (i) a thermal transfer sheet comprising a fusible layer and the peel-off layer provided on the same surface of the substrate or (ii) a first thermal transfer sheet comprising a fusible layer provided on one surface of a first substrate and a second thermal transfer sheet comprising a peel-off layer provided on one surface of a second substrate;

transferring the fusible layer onto at least a portion on the removal region of the transfer layer; and removing the removal region of the transfer layer by means of the peel-off layer after transferring the fusible-layer transfer.

6. The method for peeling off a transfer layer according to claim 5, wherein the transfer film is an intermediate transfer medium in which a transfer layer comprising a receiving layer is provided on one surface of the support.

7. The method for peeling off a transfer layer according to claim 5, wherein the transfer film is a protective layer transfer sheet in which a transfer layer comprising a protective layer is provided on one surface of the support.

8. A thermal transfer printer comprising:
a first feeding unit for feeding a transfer film in which a transfer layer is provided on one surface of a support,
a second feeding unit for feeding a thermal transfer sheet in which a peel-off layer and a fusible layer are provided on the same surface of a substrate,
a printing unit for heating the thermal transfer sheet, transferring the fusible layer onto at least a portion of a removal region of the transfer layer, and after transfer of the fusible layer, removing the removal region of the transfer layer by means of the peel-off layer,
a third feeding unit for feeding a transfer receiving article, and
a transfer unit for transferring the transfer layer from which the removal region has been removed onto the transfer receiving article.

* * * * *